(12) United States Patent
Gao et al.

(10) Patent No.: US 6,556,016 B2
(45) Date of Patent: Apr. 29, 2003

(54) INDUCTION METHOD FOR DETERMINING DIP ANGLE IN SUBTERRANEAN EARTH FORMATIONS

(75) Inventors: Li Gao, Missouri City, TX (US); Luis SanMartin, Houston, TX (US); Stanley C. Gianzero, Austin, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/927,818

(22) Filed: Aug. 10, 2001

(65) Prior Publication Data
US 2003/0057950 A1 Mar. 27, 2003

(51) Int. Cl.[7] .............................. G01V 3/28; G01V 3/38
(52) U.S. Cl. ............................................ 324/343; 702/7
(58) Field of Search ................................ 324/338–343; 702/7

(56) References Cited

U.S. PATENT DOCUMENTS

| | | | | |
|---|---|---|---|---|
| 3,060,373 | A | 10/1962 | Doll .............................. 324/1 |
| 3,510,757 | A | * 5/1970 | Huston ........................ 324/343 |
| 4,251,773 | A | 2/1981 | Cailliau et al. .............. 324/347 |
| 4,277,750 | A | * 7/1981 | Bonnet et al. ........... 324/343 X |
| 4,857,852 | A | 8/1989 | Kleinberg et al. ........... 324/339 |
| 4,972,150 | A | * 11/1990 | Tabbagh ...................... 324/339 |
| 4,980,643 | A | * 12/1990 | Gianzero et al. ............ 324/339 |
| 5,115,198 | A | 5/1992 | Gianzero et al. ............ 324/339 |
| 5,329,448 | A | 7/1994 | Rosthal ....................... 364/422 |
| 5,757,191 | A | 5/1998 | Gianzero .................... 324/339 |
| 5,886,526 | A | 3/1999 | Wu .............................. 324/338 |
| 5,966,013 | A | 10/1999 | Hagiwara .................... 324/339 |
| 5,999,883 | A | 12/1999 | Gupta et al. .................... 702/7 |
| 6,181,138 | B1 | * 1/2001 | Hagiwara et al. ............ 324/338 |
| 6,304,086 | B1 | * 10/2001 | Minerbo et al. ............. 324/338 |
| 6,393,364 | B1 | * 5/2002 | Gao et al. ....................... 702/7 |

OTHER PUBLICATIONS

*Method For Iterative Determination Of Conductivity In Anisotropic Dipping Formations*, Li Gao et al., Ser. No. 09/583,184, filed May 30, 2000.
*Virtual Steering Of Induction Tool For Determination Of Formation Dip Angle*, Li Gao et al., Ser. No. 09/925,997, filed Aug. 9, 2001.
*Method and Apparatus Using Toroidal Antennas To Measure Electrical Anisotropy*, Stanley C. Gianzero, Ser. No. 60/302,823, filed Jul. 3, 2001.

* cited by examiner

Primary Examiner—Gerard R. Strecker
(74) Attorney, Agent, or Firm—Conley Rose, P.C.

(57) ABSTRACT

A method is disclosed for the determination of the dip angle of anisotropic earth formations surrounding a wellbore. Electromagnetic couplings among a plural of triad transmitters and triad receivers are measured. Each triad transmitter/receiver consists of coil windings in three mutually orthogonal axes. The transmitter coils and receiver coils are oriented such that mutually symmetrical transmitter pairs or mutually symmetrical receiver pairs are equidistant from a centrally located receiver or transmitter, respectively. The measured signals from the created couplings are used to generate initial separate estimates of the dip angle of the formation. The two discrete determination is of dip angle are then averaged to arrive at a more accurate estimate that approaches the true dip angle in the formation.

12 Claims, 3 Drawing Sheets

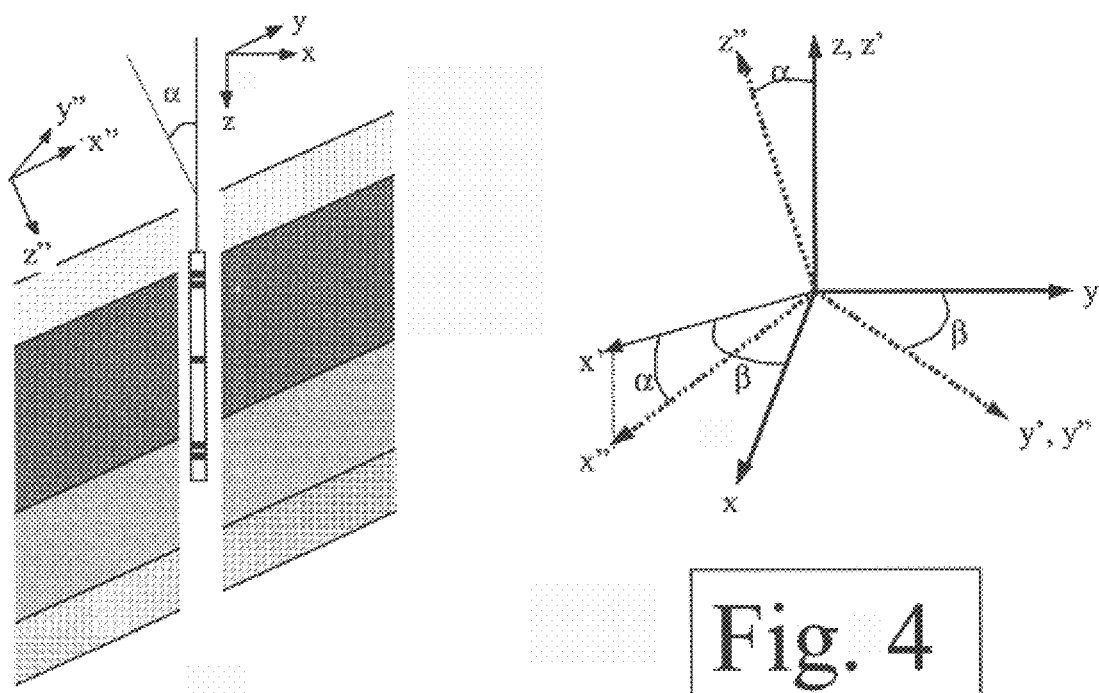
Fig. 3
Fig. 4
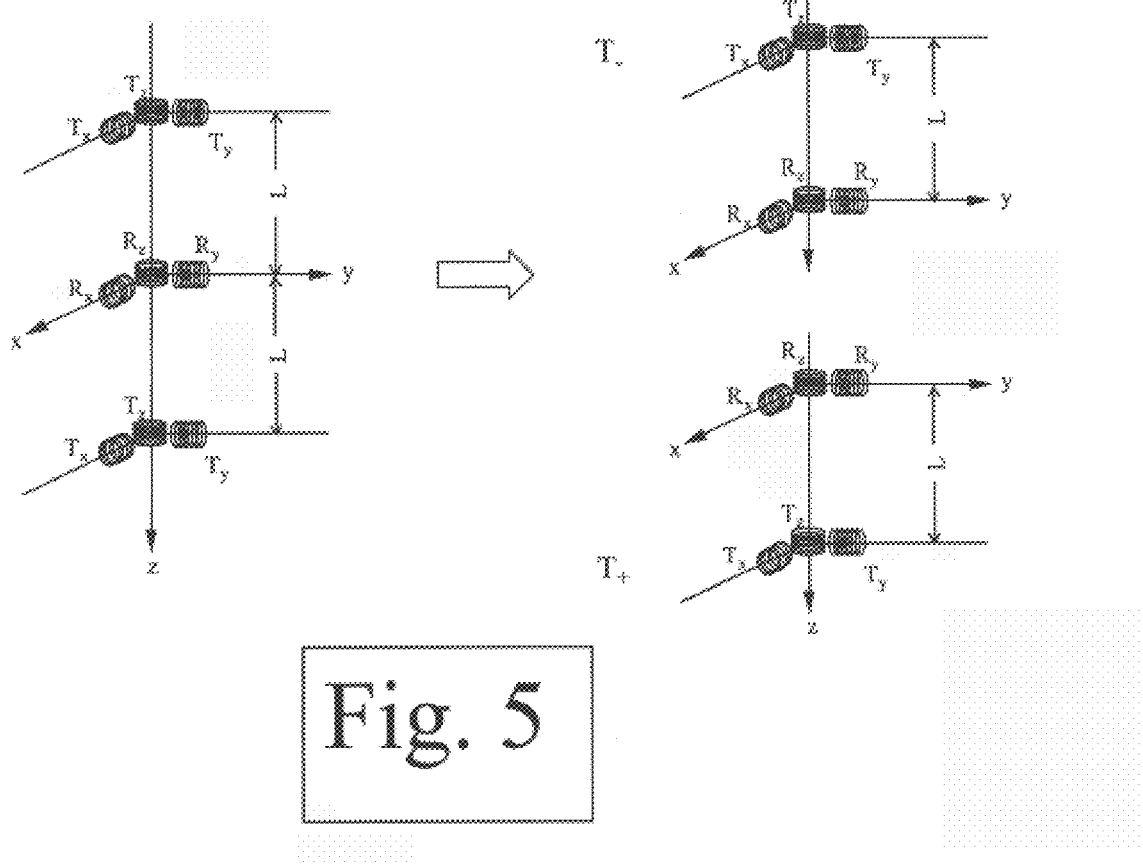
Fig. 5

INDUCTION METHOD FOR DETERMINING DIP ANGLE IN SUBTERRANEAN EARTH FORMATIONS

FIELD OF THE INVENTION

The present invention generally relates to the measurement of electrical characteristics of formations surrounding a wellbore. More particularly, the present invention relates to a method for determining the dip angle of an earth formation.

DESCRIPTION OF THE RELATED ART

The basic principles and techniques for electromagnetic logging for earth formations are well known. Induction logging to determine the resistivity (or its inverse, conductivity) of earth formations adjacent a borehole, for example, has long been a standard and important technique in the search for and recovery of subterranean petroleum deposits. In brief, the measurements are made by inducing eddy currents to flow in the formations in response to an AC transmitter signal, and then measuring the appropriate characteristics of a receiver signal generated by the formation eddy currents. The formation properties identified by these signals are then recorded in a log at the surface as a function of the depth of the tool in the borehole.

It is well known that subterranean formations surrounding an earth borehole may be anisotropic with regard to the conduction of electrical currents. The phenomenon of electrical anisotropy is generally a consequence of either microscopic or macroscopic geometry, or a combination thereof, as follows.

In many sedimentary strata, electrical current flows more easily in a direction parallel to the bedding planes, as opposed to a direction perpendicular to the bedding planes. One reason is that a great number of mineral crystals possess a flat or elongated shape (e.g., mica or kaolin). At the time they were laid down, they naturally took on an orientation parallel to the plane of sedimentation. The interstices in the formations are, therefore, generally parallel to the bedding plane, and the current is able to easily travel along these interstices which often contain electrically conductive mineralized water. Such electrical anisotropy, sometimes call microscopic anisotropy, is observed mostly in shales.

Subterranean formations are often made up of a series of relatively thin beds having different lithological characteristics and, therefore different resistivities. In well logging systems, the distances between the electrodes or antennae are great enough that the volume involved in a measurement may include several such thin beds. When individual layers are neither delineated nor resolved by a logging tool, the tool responds to the formation as if it were a macroscopically anisotropic formation. A thinly laminated sand/shale sequence is a particularly important example of a macroscopically anisotropic formation.

If a sample is cut from a subterranean formation, the resistivity of the sample measured with current flowing parallel to the bedding planes is called the transverse or horizontal resistivity $\rho_H$. The inverse of $\rho_H$ is the horizontal conductivity $\sigma_H$. The resistivity of the sample measured with a current flowing perpendicular to the bedding plane is called the longitudinal or vertical resistivity, $\rho_V$, and its inverse the vertical conductivity $\sigma_V$. The anisotropy coefficient $\lambda$ is defined as $$\lambda = \sqrt{\frac{\sigma_H}{\sigma_V}}.$$

In situations where the borehole intersects the formation substantially perpendicular to the bedding planes, conventional induction and propagation well logging tools are sensitive almost exclusively to the horizontal component of the formation resistivity. When the borehole intersects the bedding planes at an angle (a deviated borehole) the tool readings contain an influence from the vertical and horizontal resistivities. This is particularly true when the angle between the borehole and the normal to the bedding places is large, such as in directional or horizontal drilling, where angles near 90° are commonly encountered. In these situations, the influence of vertical resistivity can cause discrepancies between measurements taken in the same formation in nearby vertical wells, thereby preventing a useful comparison of these measurements. In addition, since reservoir evaluation is typically based on data obtained from vertical wells, the use of data from wells drilled at high angles may produce erroneous estimates of formation reserve, producibility, etc. if proper account is not taken of the anisotropy effect and the dip of the bedding layers.

There have been proposed a number of methods to determine vertical and horizontal resistivity near a deviated borehole. Hagiwara (U.S. Pat. No. 5,966,013) disclosed a method of determining certain anisotropic properties of formation using propagation tool without a priori knowledge of the dip angle. In U.S. Pat. No. 5,886,526, Wu described a method of determining anisotropic properties of anisotropic earth formations using a multi-spacing induction tool with assumed functional dependence between dielectric constants of the formation and its horizontal and vertical resistivity. Gupta et al. (U.S. Pat. No. 5,999,883) utilized a triad induction tool to arrive at an approximate initial guess for the anisotropic formation parameters. Moran and Gianzero (Geophysics, Vol. 44, P. 1266, 1979) proposed using a tri-axial tool of zero spacing to determine dip angle. Later the spacing was extended to finite size by Gianzero et al. (U.S. Pat. No. 5,115,198) using a pulsed induction tool. An iterative method was used in Gao et al. (U.S. patent application Ser. No. 09/583,184, now U.S. Pat. No. 6,393,364). The above references are incorporated herein by reference. These attempts to determine vertical and horizontal resistivity around a deviated borehole and/or the dip angle of the formation have not provided sufficient accuracy. A new technique is therefore needed.

BRIEF DESCRIPTION OF THE DRAWINGS

A better understanding of the present invention can be obtained when the following detailed description of the preferred embodiment is considered in conjunction with the following drawings, in which:

FIG. 3 illustrates the induction dipmeter in an earth formation with several dipping beds, where the x, y, and z axes correspond to the coordinate system of the tool, and the x', y', and z' axes correspond to the coordinate system of the earth formation;

FIG. 4 depicts the correlation between (x,y,z) coordinates in the sonde system and (x', y', z') coordinates in the earth formation system;

FIG. 5 shows how the symmetric sonde separates into two independent subarrays with transmitters $T_{31}$ and $T_+$ at $z=-L$ and $z=+L$ for the upper sonde and lower sonde, respectively.

DETAILED DESCRIPTION OF PREFERRED EMBODIMENTS

Terminology

It is noted that the terms horizontal and vertical as used herein are defined to be those directions parallel to and perpendicular to the bedding plane, respectively.

Tool Configuration

Figure 1:
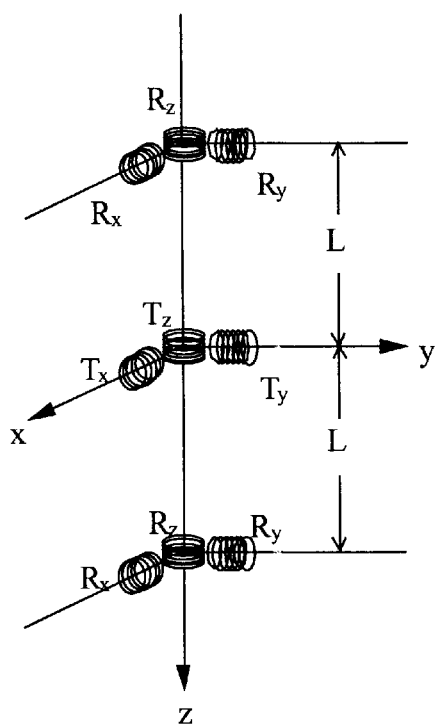
FIG. 1 shows the coil configuration of a triaxial induction tool consisting of two triaxial transmitters arrayed symmetrically about a triaxial receiver.
Figure 2:
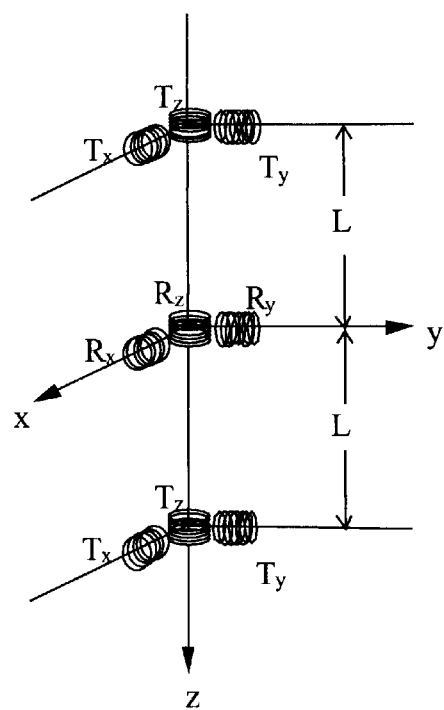
FIG. 2 shows the coil configuration of a triaxial induction tool consisting of two triaxial receivers arrayed symmetrically about a triaxial transmitter.

FIGS. 1 & 2 show conceptual sketches for coil arrangements for downhole induction tools. FIG. 2 illustrates a preferred embodiment in which the tool consists of two triaxial transmitter arrays located along the z-axis at equidistant positions above and below the receiver array R. In each transmitter array, a triad of transmitter coils $T_x$, $T_y$ and $T_z$, each oriented along a respective axis, is provided, as is a similarly oriented triad of receiver coils $R_x$, $R_y$, and $R_z$. It is assumed that the three coils in each triad represent actual coils oriented in mutually perpendicular directions, with the z-axis corresponding to the long axis of the tool. However, this coil arrangement is not a requirement of the invention, as the coil orientation presumed in the following description can be synthesized by performing a suitable transformation on coils with different triad orientations. Such transformations are described in depth in U.S. patent application Ser. No. 09/255,621, now U.S. Pat. No. 6,181,138, entitled "Directional Resistivity Measurements for Azimuthal Proximity Detection of Bed Boundaries" and filed Feb. 22, 1999 by T. Hagiwara and H. Song, which is hereby incorporated herein by reference.

In a preferred embodiment, each of the coils in the transmitter triads $T_\pm$ is parallel to the corresponding coils in the receiver triad R, and each is displaced from the corresponding coil in the receiver triad by a distance +/−L.

An alternative embodiment exists such that the tool comprises two receivers $R_\pm$ located symmetrically about a transmitter T. Depth shifting techniques may be used to convert measurements made by the embodiment shown at FIG. 1 into equivalent measurements that would have been made by the preferred embodiment. Applying a depth shift to the embodiment disclosed at FIG. 1 accounts for the 2L that separates the measured voltage at receiver arrays $R_+$ and $R_-$. The use of such depth shifting techniques is commonly known in the art and described in U.S. Pat. No. 5,065,099, "Coil array for a high resolution induction logging tool and method of logging an earth formation", by P. Sinclair and R. Strickland.

Generally, a formation model is used to interpret the tool measurements. The model used herein is a uniaxial anisotropy model. This model assumes that the formation is isotropic in the horizontal direction (parallel to the bedding plane) and anisotropic in the vertical direction (perpendicular to the bedding plane). Setting up a formation coordinate system having the z-axis perpendicular to the bedding plane and the x- and y-axes parallel to the bedding plane allows a conductivity tensor to be expressed as:

$$\sigma = \begin{bmatrix} \sigma_h & 0 & 0 \\ 0 & \sigma_h & 0 \\ 0 & 0 & \sigma_v \end{bmatrix} \quad (1)$$

The axes of the formation coordinate system typically do not correspond to the axes of the tool coordinate system. However, a rotational transform from one to the other can be defined. FIG. 4 shows a transformation from the tool coordinate system (x, y, z) to the formation coordinate system (x", y", z"). The tool coordinate system (x, y, z) is first rotated about the z-axis by an angle β hereinafter termed the strike angle. The intermediate coordinate system (x', y', z'=z) thus formed is then rotated about the y' axis by an angle α, hereinafter termed the dip angle to obtain the formation coordinate system (x", y"=y', z"). FIG. 3 illustrates a uniaxial anistropic formation with a dip α traversed by a sonde with an axis (x, y, z).

Any vector v" in the formation coordinate system can be expressed in the tool coordinate system as:

$$v = Rv'' \quad (2)$$

where the rotational transform matrix is:

$$R = \begin{bmatrix} \cos\alpha\cos\beta & \cos\alpha\sin\beta & -\sin\alpha \\ -\sin\alpha & \cos\beta & 0 \\ \sin\alpha\cos\beta & \sin\alpha\sin\beta & \cos\alpha \end{bmatrix}^{-1} \quad (3)$$

Once the rotational transformation is defined, the focus turns to the induction tool measurements. When a voltage is applied to one of the transmitter coils, a changing magnetic field is produced. The magnetic field interacts with the formation to induce a voltage in the receiver coils. Each of the transmitter coils is excited in turn, and the voltage produced at each of the receiver coils is measured. Using either two triaxial transmitters and one triaxial receiver or one triaxial transmitter and two triaxial receivers generates measured voltages that indicate 18 magnetic couplings between the transmitters and receivers.

For simplicity, the apparent dip generated by the measured magnetic couplings between transmitter and receiver triads will be addressed as separate induction dipmeters with the couplings $T_-R$ and $T_+R$. FIG. 5 shows the separate coupling of triads to obtain calculations as functions of voltage supplied through $T_-$ and $T_+$, respectively. Each coupling consists of the receiver array, R, and a transmitter, either $T_+$ or $T_-$, wherein the receiver array measures the voltages produced by each transmitter separately. Once the measured values for each transmitter T+ and T− array are recorded, the preferred embodiment allows for the separate calculations of the apparent dip and strike angles, which are subsequently used to obtain a more accurate determination of dip and strike angle for the entire formation.

The most general case according to Moran and Gianzero (Geophysics, Vol. 44, P. 1266, 1979) involves the magnetic filed H represented by a coupling matrix C. Each triad coupling $T_-R$ or $T_+R$ comprises 9 separate magnetic couplings represented by the following coupling matrix:

$$\begin{bmatrix} H_{\pm x} \\ H_{\pm y} \\ H_{\pm z} \end{bmatrix} = \begin{bmatrix} C_{xx} & C_{xy} & C_{xz} \\ C_{yx} & C_{yy} & C_{yz} \\ C_{zx} & C_{zy} & C_{zz} \end{bmatrix} \begin{bmatrix} M_{\pm x} \\ M_{\pm y} \\ M_{\pm z} \end{bmatrix} \qquad (4)$$

where $H_{\pm x}$, $H_{\pm y}$, $H_{\pm z}$ and $M_{\pm x}$, $M_{\pm y}$, $M_{\pm z}$ are the field components at the receivers and magnetic moment components at the transmitters, respectively. Using these couplings, equations can be derived and manipulated to solve for the strike angle $\beta$, the apparent dip angle $\alpha$, the horizontal conductivity $\sigma$, and the vertical anisotropy A. These equations and their derivation are explained in depth in Gao et al., U.S. patent application Ser. No. 09/583,184.

Assuming the tool is oriented so that the strike angle is zero, it can be shown that for the uniaxial anisotropy model the full coupling matrix C″, corresponding to the formation coordinate system at the receiver coils (x=0, z=L) simplifies to:

$$C'' = \begin{bmatrix} C_{xx} & 0 & C_{xz} \\ 0 & C_{yy} & 0 \\ C_{zx} & 0 & C_{zz} \end{bmatrix} \qquad (5)$$

wherein the theoretical values of the coupling matrix elements are ($C_{ij}=C_{ji}$):

$$C_{xx} = \frac{1}{4\pi L^3}\left[k_h^2 L^2 \cos^2\alpha \cdot e^{ik_h L} - ik_h L\left(\frac{e^{ik_h LA} - e^{ik_h L}}{\sin^2\alpha}\right) + (3\sin^2\alpha - 1)(1 - ik_h L)e^{ik_h L}\right] \qquad (6)$$

$$C_{xy} = C_{yz} = 0 \qquad (7)$$

$$C_{xz} = \frac{-\sin\alpha\cos\alpha}{4\pi L^3} e^{ik_h L}[3(1 - ik_h L) - k_h^2 L^2] \qquad (8)$$

$$C_{yy} = \frac{1}{4\pi L^3}\left[\frac{k_h^2 L^2}{\lambda A^2} e^{ik_h L} + ik_h L\left(\frac{e^{ik_h LA} - e^{ik_h L}}{\sin^2\alpha}\right) - (1 - ik_h L)e^{ik_h L}\right] \qquad (9)$$

$$C_{zz} = \frac{1}{4\pi L^3} e^{ik_h L}[k_h^2 L^2 \sin^2\alpha + (1 - ik_h L)(3\cos^2\alpha - 1)] \qquad (10)$$

Likewise, the six independent measurements for all possible couplings between all transmitter-receiver pairs are expressed as ($T_iR_j=T_jR_i$):

$$T_xR_x = \frac{M}{2}\{[(C_{xx}+C_{zz})+(C_{xx}-C_{zz})\cos2\alpha + 2C_{xz}\sin2\alpha]\cos^2\beta + 2C_{yy}\sin^2\beta\} \qquad (11)$$

$$T_yR_y = \frac{M}{2}\{[(C_{xx}+C_{zz})+(C_{xx}-C_{zz})\cos2\alpha + 2C_{xz}\sin2\alpha]\sin^2\beta + 2C_{yy}\cos^2\beta\} \qquad (12)$$

$$T_zR_z = \frac{M}{2}[(C_{xx}+C_{zz})+(C_{zz}-C_{xx})\cos2\alpha - 2C_{xz}\sin2\alpha] \qquad (13)$$

$$T_xR_y = \frac{M}{4}[(C_{xx}+C_{zz})+(C_{xx}-C_{zz})\cos2\alpha + 2C_{xz}\sin2\alpha - 2C_{yy}]\sin2\beta \qquad (14)$$

$$T_zR_x = \frac{M}{2}[(C_{zz}-C_{xx})\sin2\alpha + 2C_{xz}\cos2\alpha]\cos\beta \qquad (15)$$

$$T_zR_y = \frac{M}{2}[(C_{zz}-C_{xx})\sin2\alpha + 2C_{xz}\cos2\alpha]\sin\beta \qquad (16)$$

These measurements are made by taking the ratio of the transmit and receive voltage signals, e.g., $T_xR_y=K\,V_{Ry}/V_{Tx}$, where K is a real-valued calibration constant theoretically equal to $A_T N_T I_T A_R N_R (\omega\mu)^2/4\pi L$, where the magnetic moment, $M_{\pm T}$, is equal to $A_{\pm T}N_{\pm T}I_{\pm T}$, wherein $A_{\pm T}$, $N_{\pm T}$, and $I_{\pm T}$ correspond to the area, number of turns, and current of the transmitter coils, respectively, $A_R$ is the area of the receive coil, and $N_R$ is the number of turns of the receive coil. Explicitly solving equations (13)–(16) results in the following expressions for the measured cross-coupling fields (note that the calculations below must be performed for each of the transmitters $T_+$ and $T_-$):

$$T_xR_y = \frac{M\sin2\beta}{8\pi L^3}\left[k_h^2 L^2\left(e^{ik_h L} - \frac{e^{ik_h LA}}{\lambda^2 A}\right) - ik_h L(e^{ik_h LA} - e^{ik_h L})\frac{(1+\cos^2\alpha)}{\sin^2\alpha}\right] \qquad (17\text{-a})$$

$$T_zR_x = \frac{M\cos\beta\sin2\alpha}{8\pi L^3\sin^2\alpha} ik_h L(e^{ik_h LA} - e^{ik_h L}) \qquad (17\text{-b})$$

$$T_zR_y = \frac{M\sin\beta\sin2\alpha}{8\pi L^3\sin^2\alpha} ik_h L(e^{ik_h LA} - e^{ik_h L}) \qquad (17\text{-c})$$

$$T_zR_z = \frac{M}{4\pi L^3}[2e^{ik_h L}(1 - ik_h L) - ik_h L(e^{ik_h LA} - e^{ik_h L})] \qquad (17\text{-d})$$

To make practical use of the above equations, the real component is ignored and the imaginary (reactive) component is simplified by finding the limit as the transmitter-receiver spacing approaches zero, i.e., L→0. Doing this simplifies the reactive components of the measured signal equations (18–a,b,c) to:

$$(T_{\pm x}R_y)_x \to \frac{M\sin2\beta\sin\alpha}{8\pi\lambda^2\delta_h^3}(1-\lambda^2) \qquad (18\text{-a})$$

$$(T_{\pm z}R_x)_x \to \frac{M\cos\beta\sin2\alpha}{8\pi\lambda^2\delta_h^3}(1-\lambda^2) \qquad (18\text{-b})$$

$$(T_{\pm z}R_y)_x \to \frac{M\sin\beta\sin2\alpha}{8\pi\lambda^2\delta_h^3}(1-\lambda^2) \qquad (18\text{-c})$$

where $\delta_h = \sqrt{2/\omega\mu\sigma_h}$ is the skin depth associated with horizontal conductivity. From these equations, one arrives at the practical equations for the determination of dip and strike angles:

$$\beta_\pm = \tan^{-1}\left[\frac{(T_{\pm z}R_y)_x}{(T_{\pm z}R_x)_x}\right] \qquad (19)$$

$$\alpha_\pm = \tan^{-1}\left[\sqrt{\left[\frac{(T_{\pm x}R_y)_x}{(T_{\pm z}R_x)_x}\right]^2 + \left[\frac{(T_{\pm x}R_y)_x}{(T_{\pm z}R_y)_x}\right]^2}\right] \qquad (20)$$

As noted in Gao et al. U.S. patent application Ser. No. 09/583,184, the strike angle $\beta$ obtained is exact while the dip angle $\alpha$ is only an approximation because Equations (18a–c) are valid only in the zero-spacing limit. The subscript ± denotes that values are obtained for each of the transmitters located at +L and −L.

Whereas methods in the past have used an iterative process to determine closer approximations of the dip angle $\alpha$, a simpler method exists in the present invention. A new method is now proposed which compensates for the presence of surface charges located at the boundaries of formation layers that affect measured voltages in the receivers of dipmeters. By using the stated embodiment, two values for the dip angle measured from a transmitter located above the receiver at a distance −L and one measured from a transmitter located below the receiver at a distance +L—can be averaged to determine a more accurate estimation of the dip angle:

$$\alpha_a = \frac{\alpha_- + \alpha_+}{2}. \quad (21)$$

Figure 6:
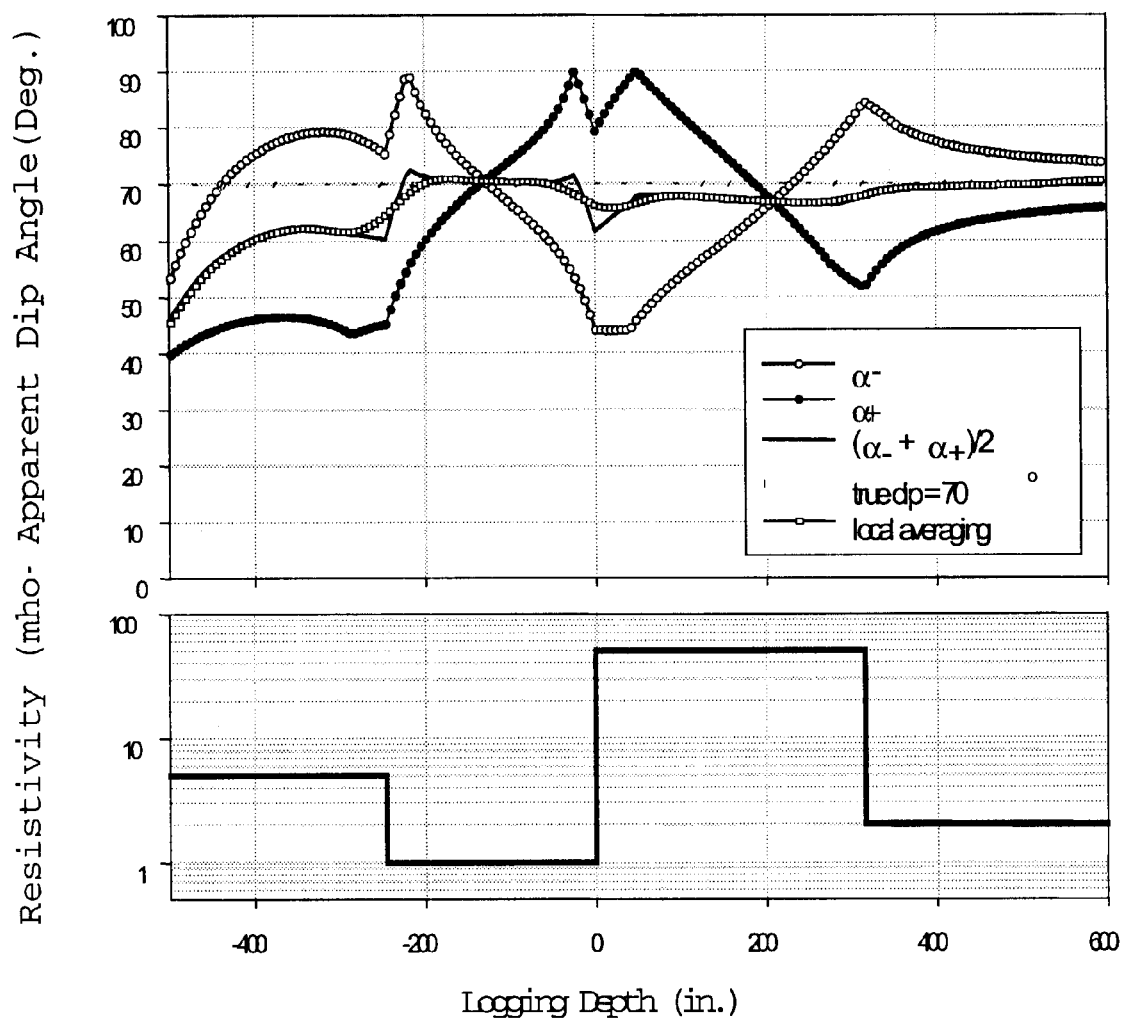
FIG. 6 illustrates the improved accuracy of using the symmetrical triaxial tool. The upper graph shows the average of the two values of apparent dip as a function of logging depth, and the lower graph shows the resistivity profile of a four-bed formation using the more accurate calculation of the formation dip angle.

By using equidistant transmitters, the surface charge is effectively cancelled with respect to the measured voltages in the receiver. FIG. 6 illustrates the resulting calculation of dip angle at various logging depths.

Another embodiment comprises mutually symmetrical receiver pairs about a triaxial transmitter. A depth-shift transformation, commonly known to those of ordinary skill in the art, may be used to transform the values obtained at one the receivers to conform to the location of the other. The calculations and method for determining dip angle is identical after the measured values have been transformed to compensate for the distance 2L at which the values were measured.

Additional embodiments of the claimed subject matter exist wherein the tool comprises a plurality of mutually symmetrical triaxial transmitters or receivers located symmetrically about a receiver or transmitter, respectively, such that the apparent dip angle of the formation corresponds to the average of the apparent dip angles calculated from each mutually symmetrical array:

$$\alpha = \frac{\sum_{1}^{n} \left[\frac{\alpha_{-n} + \alpha_{+n}}{2}\right]}{n}. \quad (22)$$

It is further emphasized that through the more accurate calculation of formation dip angle, other formation parameters, such as formation anisotropy, vertical and horizontal conductivity and resistivity, and strike angle will be capable of more accurate determination as well, as such parameters are calculated as functions of the formation dip angle.

What is claimed is:

1. A method for determining a dip angle of an earth formation with respect to a borehole in the formation, wherein the method comprises:

measuring a magnetic coupling between a central set of coils and each of two outer sets of coils in a tool in the borehole, wherein the sets of coils comprise a combination of transmitter and receiver coils, wherein the outer sets of coils are symmetrically spaced from the central set of coils; and obtaining from the measured couplings the dip angle of the formation, wherein the dip angle corresponds to $$\alpha = \frac{\alpha_- + \alpha_+}{2},$$

wherein $\alpha_-$ is an approximate dip angle obtained from a measured coupling between the central set of coils and one of the outer sets of coils, and wherein $\alpha_+$ is an approximate dip angle obtained from a measured coupling between the central set of coils and an opposing one of the outer sets of coils.

2. The method of claim 1, wherein the central set of coils is a tri-axial receiver array R with an $R_z$ coil oriented parallel to a long axis of the tool, an $R_x$ coil oriented perpendicular to the long axis of the tool, and an $R_y$ coil oriented perpendicular to both the $R_x$ and $R_z$ coils, and wherein the outer sets of coils are tri-axial transmitter arrays $T_+$ and $T_-$ each having $T_x$, $T_y$, and $T_z$ coils oriented parallel to the corresponding coils of the tri-axial receiver array.

3. The method of claim 2, wherein the approximate dip angle values $\alpha_\pm$ correspond to $$\alpha_\pm = \tan^{-1}\left[\sqrt{\left[\frac{(T_{\pm x}R_y)_x}{(T_{\pm z}R_x)_x}\right]^2 + \left[\frac{(T_{\pm x}R_y)_x}{(T_{\pm z}R_y)_x}\right]^2}\right],$$

wherein $(T_{+x}R_y)_x$ is the reactive component of a coupling between transmitter $T_{+x}$ receiver $R_y$, $(T_{+z}R_x)_x$ is the reactive component of a coupling between transmitter $T_{+z}$ and receiver $R_x$, and $(T_{+z}R_y)_x$ is the reactive component of the coupling between transmitter $T_{+z}$ and receiver $R_y$, $(T_{-x}R_y)_x$ is the reactive component of a coupling between transmitter $T_{-x}$ receiver $R_y$, $(T_{-z}R_y)_x$ is the reactive component of a coupling between transmitter $T_{-z}$ and receiver $R_x$, and $(T_{-z}R_y)_x$ is the reactive component of the coupling between transmitter $T_{-z}$ and receiver $R_y$.

4. The method of claim 1, wherein the number of couplings necessary to generate dip and strike information is at least six.

5. The method of claim 1, wherein the axes of the transmitters and receivers do not include an axis of symmetry that is parallel or orthogonal to a long axis of the tool.

6. A method for determining a dip angle of an earth formation with respect to a borehole in the formation, wherein the method comprises:

measuring a magnetic coupling between a central set of coils and each of two outer sets of coils in a tool in the borehole, wherein the sets of coils comprise a combination of transmitter and receiver coils, wherein the outer sets of coils are symmetrically spaced from the central set of coils; and obtaining from the measured couplings the dip angle of the formation, wherein the tool includes N outer sets of coils, each set being symmetrically spaced from the central set of coils, wherein the dip angle corresponds to:

$$\alpha = \frac{\sum_{1}^{N} \left[\frac{\alpha_{-n} + \alpha_{+n}}{2}\right]}{N},$$

wherein $\alpha_{-n}$ is an approximate dip angle obtained from a measured coupling between the central set of coils and one array of the nth outer set of coils, and wherein $\alpha_{+n}$ is an approximate dip angle obtained from a measured coupling between the central set of coils and an opppsing array of the nth outer set of coils.

7. A method for determining the dip angle of an earth formation with respect to a tool in a borehole in the formation, wherein the method comprises:

measuring a magnetic coupling between one set of transmitter coils and one or more pairs of symmetrically-spaced receiver coil arrays of a tool in the formation, wherein the pairs of receiver coil arrays are symmetrically spaced about the set of transmitter coils; and obtaining from the measured coupling the dip angle of the formation, wherein the apparent dip angle $\alpha$ corresponds to $$\alpha = \frac{\alpha_- + \alpha_+}{2},$$

wherein $\alpha_-$ and $\alpha_+$ correspond to the measured values of the formation dip angle based on measurements from receiver coil arrays $R_-$ and $R_+$, respectively, and transmitter array T.

8. The method of claim 7, wherein receiver coil arrays $R_\pm$ are multi-axial receiver arrays with coils corresponding to the z, x, and y axes, wherein the z axis approximates the axis of the borehole, and the receiver coil arrays are located symmetrically along the z-axis such that triaxial transmitter array T is located at z=0 and receiver coil arrays $R_\pm$ are respectively located at z=±L.

9. The method of claim 8, wherein two approximate values of dip angle $\alpha_\pm$ are obtained which correspond to the depth-shift transformed couplings of the following:

$$\alpha_\pm = \tan^{-1}\left[\sqrt{\left[\frac{(T_x R_{\pm y})_x}{(T_z R_{\pm x})_x}\right]^2 + \left[\frac{(T_x R_{\pm y})_x}{(T_z R_{\pm y})_x}\right]^2}\right],$$

wherein $(T_x R_{\pm y})_x$ is the reactive component of the coupling $T_x R_{\pm y}$ between a transmitter $T_x$ oriented along an x-axis and a receiver coil $R_{\pm y}$ oriented along a y-axis, $(T_z R_{\pm x})_x$ is the reactive component of the coupling $T_z R_{\pm x}$ between a transmitter $T_z$ oriented along a z-axis and a receiver coil $R_{\pm x}$ oriented along the x-axis, and $(T_z R_{\pm y})_x$ is the reactive component of the coupling $T_z R_{\pm y}$ between transmitter $T_z$ oriented along a z-axis and a receiver coil $R_{\pm y}$ oriented along the y-axis.

10. The method of claim 7, wherein the number of couplings necessary to generate dip and strike information is at least six.

11. The method of claim 7, wherein the axes of the transmitters and receiver coils do not include an axis of symmetry that is parallel to or orthogonal to the long axis of the tool.

12. A method for determining the dip angle of an earth formation with respect to a tool in a borehole in the formation, wherein the method comprises:

measuring a magnetic coupling between one set of transmitter coils and one or more pairs of symmetrically-spaced receiver coil arrays of a tool in the formation, wherein the pairs of receiver coil arrays are symmetrically spaced about the set of transmitter coils; and obtaining from the measured coupling the dip angle of the formation, wherein the tool includes N pairs of symmetrically spaced receiver coil arrays $R_{\pm n}$, wherein the dip angle corresponds to:

$$\alpha = \frac{\sum_{1}^{N}\left[\frac{\alpha_{-n} + \alpha_{+n}}{2}\right]}{N},$$

wherein $\alpha_{-n}$ is an approximate dip angle obtained from a measured coupling between the transmitter coils and one receiver coil array of the nth pair, and wherein $\alpha_{+n}$ is an approximate dip angle obtained from a measured coupling between the central set of coils and an opposing receiver coil array of the nth pair.

* * * * *